US009280400B2

(12) United States Patent
Boskovic

(10) Patent No.: US 9,280,400 B2
(45) Date of Patent: *Mar. 8, 2016

(54) APP SYSTEM PLATFORM

(75) Inventor: Srdjan Boskovic, Heidelberg (DE)

(73) Assignee: SAP SE, Walldorf (DE)

( * ) Notice: Subject to any disclaimer, the term of this patent is extended or adjusted under 35 U.S.C. 154(b) by 396 days.

This patent is subject to a terminal disclaimer.

(21) Appl. No.: 13/327,060

(22) Filed: Dec. 15, 2011

(65) Prior Publication Data

US 2013/0159379 A1   Jun. 20, 2013

(51) Int. Cl.
*G06F 15/16* (2006.01)
*G06F 9/54* (2006.01)

(52) U.S. Cl.
CPC ..................................... *G06F 9/541* (2013.01)

(58) Field of Classification Search
USPC ........................................................ 709/203
See application file for complete search history.

(56) References Cited

U.S. PATENT DOCUMENTS

| 2002/0054170 | A1 | 5/2002 | Rush et al. |
| 2003/0084203 | A1* | 5/2003 | Yoshida et al. ............... 709/328 |
| 2004/0163037 | A1* | 8/2004 | Friedman et al. .......... 715/501.1 |
| 2005/0289202 | A1* | 12/2005 | S et al. .......................... 708/112 |
| 2007/0055781 | A1 | 3/2007 | Fleischer et al. |
| 2008/0082539 | A1* | 4/2008 | Doane et al. ....................... 707/9 |
| 2009/0157629 | A1* | 6/2009 | Gutlapalli et al. ................ 707/3 |
| 2009/0313644 | A1* | 12/2009 | Klets et al. ..................... 719/328 |
| 2010/0269047 | A1* | 10/2010 | Pahlavan et al. .............. 715/740 |
| 2011/0145893 | A1* | 6/2011 | Tock et al. ......................... 726/4 |
| 2011/0202377 | A1* | 8/2011 | Maiya et al. ................. 705/7.11 |
| 2011/0282969 | A1* | 11/2011 | Iyer et al. ...................... 709/217 |
| 2012/0096384 | A1* | 4/2012 | Albert et al. .................. 715/772 |
| 2012/0215894 | A1* | 8/2012 | Zheng et al. .................. 709/223 |

OTHER PUBLICATIONS

"U.S. Appl. No. 13/693,807, Non Final Office Action mailed Mar. 12, 15", 13 pgs.
"U.S. Appl. No. 13/693,807, Response filed Aug. 12, 15 to Non Final Office Action mailed 03-122-15", 10 pgs.

* cited by examiner

*Primary Examiner* — Brian J Gillis
*Assistant Examiner* — Juan C Turriate Gastulo
(74) *Attorney, Agent, or Firm* — Schwegman Lundberg & Woessner, P.A.

(57) ABSTRACT

Embodiments illustrated and described herein provide systems, methods, and software of an app system platform that enables apps to provide rich user experiences in accessing and utilizing functionality of an enterprise-class computing system, such as an ERP system. Some such embodiments include groups of mapper objects in a web framework for each supported app that handle specific data types communicated between the app and a web platform. The mapper objects transform data between app consumable formats and formats of connector objects. The connector objects operate to transform data between the respective connector object formats and data formats of consumable by an enterprise-class computing system via interfaces. These and other embodiments are illustrated and described herein.

18 Claims, 5 Drawing Sheets

APP SYSTEM PLATFORM

BACKGROUND INFORMATION

Modern enterprise-class computing systems, such as Enterprise Resource Planning (ERP) systems, are highly capable of performing processing functions for many organizations. However, for many different reasons user interaction with such systems has generally required users to at least be connected to a particular network or utilize a thick-client application. Thus, despite the modern-nature of enterprise-class computing systems, users have not been able to interact with these systems according to modern application delivery models, such as through apps delivered via one or both of a web browser and device apps, such as an app that executes on a smartphone-type device.

DETAILED DESCRIPTION

Figure 1:
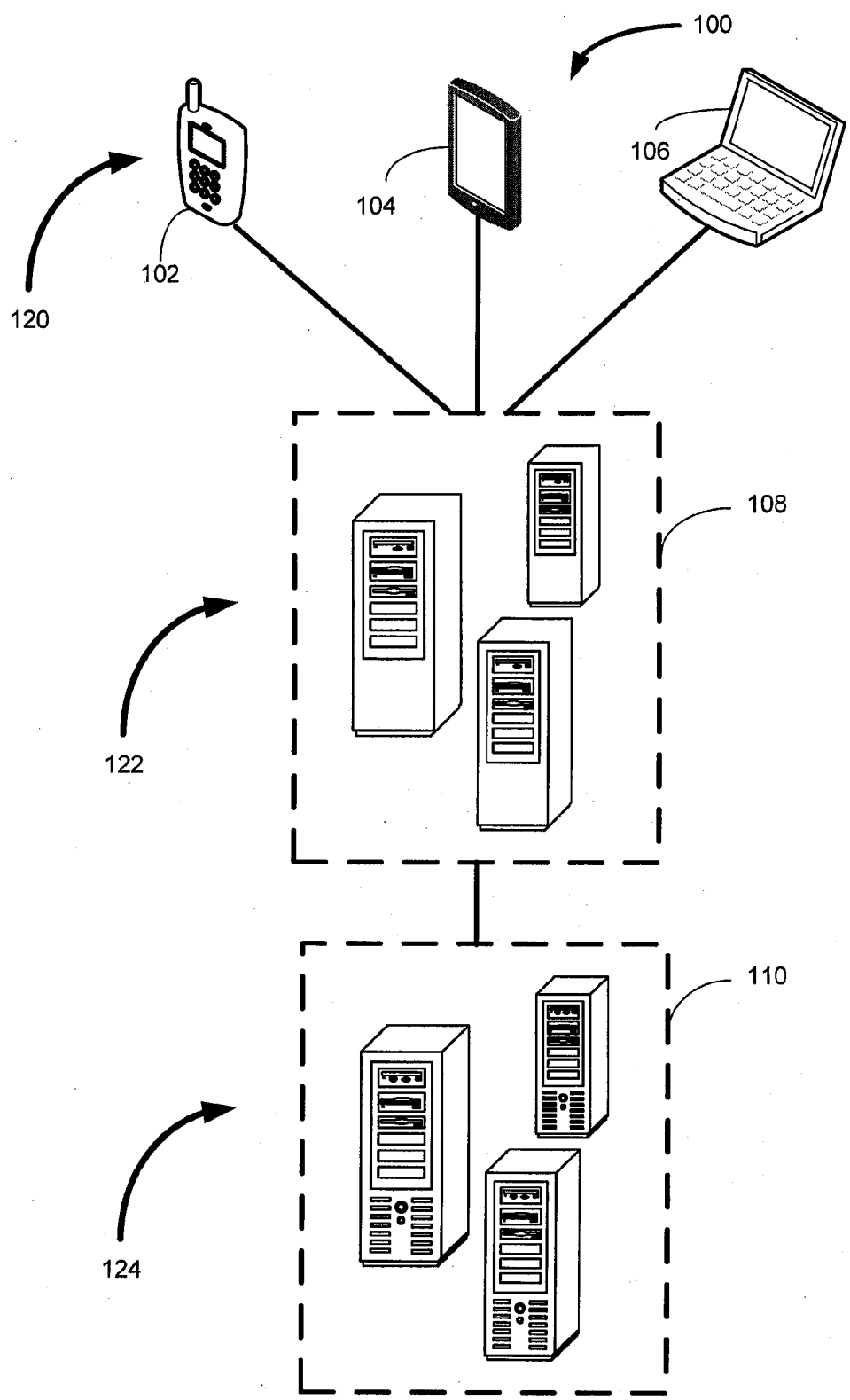
FIG. 1 is a diagram of a system, according to an example embodiment.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Concepts like "apps" or "appstore" are today closely related to mobile apps and devices. Apps are light, fast, intuitive, and nice. Modern enterprise-class computing systems, such as Enterprise Resource Planning (ERP) systems, can be viewed as the opposite of apps, often being rigid, monolithic, and cryptic. Much of the functional value of such enterprise-class computing systems is often in the business logic implemented therein. However, the delivery of the functional value in such enterprise-class computing systems does not meet modern standards of rich user experiences, as typically provided by apps, and are often tethered exclusively to specific desktop platforms.

Various embodiments illustrated and described herein provide a platform for scalable and flexible delivery of the enterprise-class computing system functional value to any device, through native device and browser-based apps while allowing rich user experiences with high performance. Such apps are provided through unification with an architecture of an enterprise-class computing system to enable delivery and enhancement of functionality at the level of mobile devices and web browsers. These embodiments enable new solutions and greater organizational and user flexibility.

These new and flexible solutions leverage an enterprise-class computing system backend, which persists data, logic, and user interface definitions, which are transformed within a web framework for delivery to apps. Some such embodiments include connector objects that connect the web framework to the enterprise-class computing system backend and object mappers that transform data between connector objects and formats needed by apps. Different forms of data may be communicated, connected, and transformed in accordance with various communication protocols and data formatting specifications, which may include one or more of open standards-based, proprietary, and implementation specific communication protocols and data formatting specifications. Example embodiments of some such solutions are illustrated and described with regard to FIG. 1 and FIG. 2.

FIG. 1 is a diagram of a system 100, according to an example embodiment. The system 100 is an example of how computing devices of an app system platform may be implemented. While specific device types and numbers thereof may be illustrated and described, these devices types and the numbers of these device types are provided only as an example and other device types and numbers of device types may be chosen and implemented in other embodiments.

The system 100 generally includes three layers of devices. These layers include a delivery layer 120, a web platform layer 122, and an enterprise layer 124.

The delivery layer 120 includes various computing devices 102, 104, 106 upon which apps may be delivered according to the various embodiments herein. The various computing devices 102, 104, 106 may include a smartphone 102, a tablet 104, and a personal computer 106 (i.e., laptop, desktop, etc.). Other device types may include set top boxes; web-enabled televisions; a smart, web-enabled console of an automobile; an optical disk player (i.e., DVD player, Blu-ray player); and other device-types that currently or may in the future be enabled for apps that are either native device apps or apps that may operate within a web browser.

The web platform layer 122 may include one or more computing devices connected to a network, such as the Internet, over which the web platform layer 122 may communicate with devices in the delivery layer 120. The web platform layer 122 also communicates with devices in the enterprise layer 124 over a network, which may be the same network over which the web platform layer 122 communicates with the delivery layer 120 or a different network, such as one or more of a system area network, a local area network, and other network types.

The web platform layer 122 typically includes at least one computing device 108 upon which a web server and an application framework execute to receive, process, and fulfill data requests from devices in the delivery layer 120. As is readily apparent to a person of skill in the art, the web platform layer 122 may include many computing devices that may be co-located or distributed in multiple locations, but operate in conjunction with one another to load balance, enhance security and reliability, and meet demand needs with low latency.

The enterprise layer 124 is representative of one or more enterprise-class computing systems, such as an ERP system, for example an ERP system available from SAP AG of Waldorf, Germany. ERP systems operate on at least one computing device 110, but in many instances, an ERP system may operate on many computing devices 110. ERP systems generally integrate management functions of an organization, often including modules for accounting, finance, customer relationship management, manufacturing, sales, service, and other business functions. ERP systems persist data in databases and provide functionality and data processing capabilities throughout an organization. User interaction with ERP systems is often through thick-client applications. Some ERP systems provide abilities for users to interact with the system through web pages. However, ERP systems that allow interaction via web pages are typically provided via a hosted, Software-as-a-Service model and are entirely web-based and are not operated nor maintained by the organization the web-based ERP solution is supporting.

The web platform layer 122 provides abilities to organizations utilizing an ERP system that they self-host to deliver ERP system functionality to native device apps and web browsers. The web platform layer 122 bridges the two different computing worlds and sophisticated architectural make-ups of ERP systems and web solutions. Through connector and mapper objects within the web platform layer 122, data, user interface definitions, and functionality are transformed to enable apps in the delivery layer to provide rich user experiences with regard to the functionality embedded within the enterprise layer 124.

Figure 2:
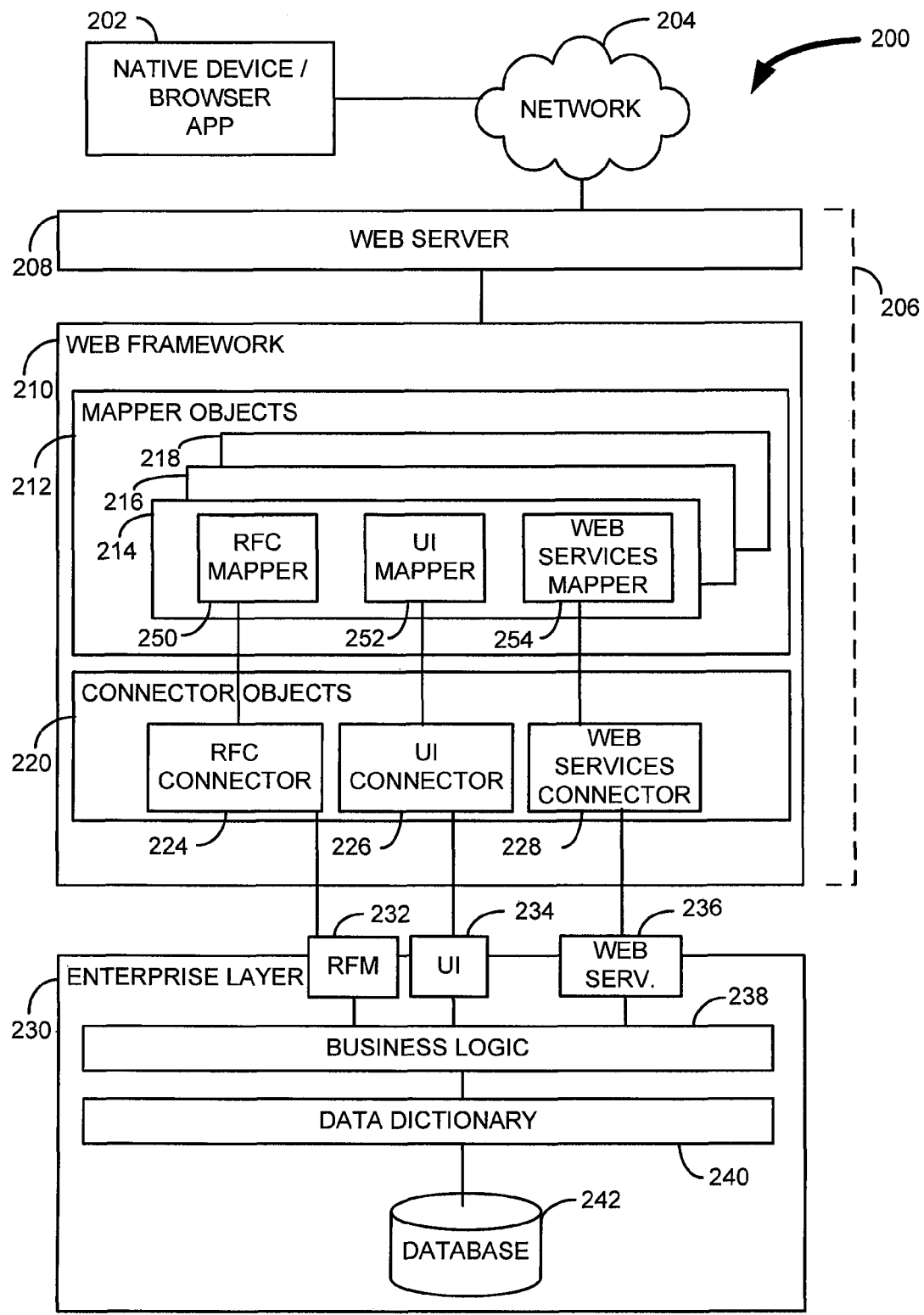
FIG. 2 is a logical diagram of a system, according to an example embodiment.

FIG. 2 is a logical diagram of a system 200, according to an example embodiment. The system 200 operates to provide functionality of an application of an enterprise layer 230 in an app 202 that executes on a device, such as one of the devices 102, 104, 106 of FIG. 1.

The app 202 communicates with a web server 208 over a network 204, such as the Internet and may include one or both of a wireless computer network and 3G or 4G wireless network connection. The web server 208 is one element of a web platform layer 206 of the system 200. The web platform layer 206 also includes a web framework 210, which in some contexts is referred to as a web application framework or an application server. Objects execute within the web framework 210 to communicate with an application, such as an enterprise-class computing system that executes in an enterprise layer 230.

The web server 208 is generally a software application that operates to receive, process, and respond to data requests received via the network from the app 202. The web server 208, in some embodiments, may be an NGINX™ web server. However, in other embodiments the web server may be of a different type, such as an Apache web server. The web server 208 may retrieve data, including content, in response to received requests or redirect requests to another network location capable of servicing the request. In some embodiments, the web server 208 communicates via a Web Server Gateway Interface (WSGI) with the web framework 210, or other interface depending on the particular type of the web framework 210, to route requests to different objects that execute within the web framework 210. Requests are typically routed by the web server 208 based on a Universal Resource Identifier (URI), such as a Universal Resource Locator (URL), or routing data included in a request.

The web framework 210 is generally a software framework within which other computer code, compiled or scripting code, can execute, such as objects. The web framework 210 typically includes existing facilities leveraged by objects that execute therein to access databases, templates, content of various types, to access functions commonly used by objects, and other facilities. The web framework 210 may also perform other functions such as session management, caching, providing at least one interface such as a WSGI interface for receiving and making requests of other system 200 elements, and other ancillary services. The web framework 210, in some embodiments may be a Pyramid web framework, but other web frameworks are utilized in other embodiments, such as Python™ web frameworks Zope and Django®, Ruby programming language web framework Ruby on Rails® (RoR), and other competing frameworks. Objects that execute within the web framework 210 are typically accessed via the WSGI interface of the web framework 210 by the web server 208, and in some instances by a process in an enterprise layer 230.

The enterprise layer 230 generally represents an enterprise-class computing system, such as an ERP system. An example ERP system, such as an ERP system available from SAP AG of Waldorf, Germany, includes business logic 238 executable to perform activities including creating, reading, updating and deleting data stored in one or more databases 242. Some such systems may utilize a data dictionary 240 that informs various elements of the enterprise layer 230 about data stored in the one or more databases 242 about meaning, data relationships, formats, usage, dependencies, primary and secondary sources of the data, storage locations, and other information about data stored in the one or more databases 242. The business logic 238 may provide not only receive data and command input, but also may provide data output and user interface information to requestors. In some embodiments, the business logic 238 may also push data to the app 202 via the web platform layer 206.

Within the enterprise layer 230, input is received and output is provided via one or more interfaces 232, 234, 236. The interfaces 232, 234, 236 each typically communicate data in distinct forms from one another. Although three interfaces 232, 234, 236 are illustrated and described, other embodiments may include fewer, more, and different interfaces according to different communication protocol and data specifications.

Interface 232, in some embodiments, is a remote function module that exists to receive and reply to remote function calls. The interface 232 may communicate remote function calls and responses via TCP/IP, HTTP(S), or other protocol with the data encoded according to a proprietary remote function standard, XML, or other data-encoding standard.

Interface 234 may be a user interface module that exists to receive and respond to requests for user interface definitions from which user interfaces are generated. For example, some ERP systems provide client application user interface definitions, which are consumed by client applications to present user interfaces for presenting data and receiving input. Such user interface data may be communicated via the interface 234 via a protocol such as HTTP(s) encoded according to one or more of several data formats. User interface data transmitted via the interface 234 may, in some embodiments, also include application data. The data formats of the interface 234 may be text, HTML, XML, Java Script Object Notation (JSON), or other lightweight text-based open standard design tailored for human-readable data interchange.

Interface 236 is a web services interface that receives and provides web service functionality and data. The interface 236 may communicate via HTTP(S) or other suitable protocol depending on the particular embodiment. Data received and communicated via the interface 236 may be encoded according to a standard, such as XML, Simple Object Access Protocol, or other standard.

Conventionally, the interfaces 232, 234, 236 have been utilized to facilitate enterprise layer 230 communication directly with client applications in a standard, client-server type architecture. Client applications directly access data, make remote function calls, and access web services. However, such client applications do not provide the flexibility, rich user experiences, and mobility expected by modern application users. Thus, to facilitate the app 202 providing the type of experience users expect in modern computing and with the functionality of an enterprise-class computing system, embodiments may include two types of objects in the web platform layer 206 that execute within the web framework 210. The two types of objects are mapper objects 212 and connector objects 220.

Mapper objects 212 include groups 214, 216, 218 of mapper objects for each app 202 supported by the system 200. Each app 202 supported by the system 200 is an app that may operate on multiple different device and browser platforms, but in the sense of the system 200 is a single supported app. For example, the app 202 may execute on multiple smartphone device types, multiple tablet device types, and within multiple browser types that support apps or are otherwise capable of executing app code elements within the browser, such as an applet. Thus, as illustrated in FIG. 2, the system 200 supports multiple apps 202 and each app 202 is supported by a respective group 214, 216, 218 of mapper objects 212.

In some embodiments, each group 214, 216, 218 of mapper objects 212 includes a mapper object for each type of connector object 220 that exists in the system 200. The connector objects 220 include a connector object for each of the interfaces 232, 234, 236 within the enterprise layer 230. Thus, as illustrated in FIG. 2, the system 200 supports three different apps due to the three groups 214, 216, 218 of mapper objects 212. Each group 214, 216, 218 of mapper objects 212 includes an object, such as mapper objects 250, 252, 254, for each respective connector object 224, 226, 228. Each connector object 224, 226, 228 also has a respective enterprise layer 230 interface 232, 234, 236.

Mapper objects 212 execute to process data requests forwarded by the web server 208 and data received from connector objects 220. The web server 208 or a process of the web framework 210 selects an appropriate mapper object 212 to receive the request based on at least one of an app from which the data request was received and a data interchange protocol the request is encoded in. For example, in some embodiments and as illustrated in FIG. 2, mapper objects 212 include groups 214, 216, 218 of mapper objects where each group is implemented with regard to a particular app. Thus, when a request is received, the request is routed to a mapper object in the mapper object group of the app from which the request was received. Further, depending on the request type, a particular one of the mapper objects in an appropriate object mapper group 214, 216, 218 will be invoked. The appropriate mapper object in the appropriate object mapper group 214, 216, 218 may be identified based on a protocol utilized in transmitting or encoding the request. For example, if the request is encoded in a HTML, the request may be for user interface data and the request is routed to a user interface mapper object 252 of the appropriate mapper object group. Similarly, if the request is a remote function call or a web services call, the request is routed to a remote function call mapper object 250 and a web services mapper object 254, respectively.

Each mapper object 212 executes to perform different functions. These functions of each mapper objet 212 include transforming data between the data interchange protocol of the app and a format of a connector object 220 associated with the particular mapper object 212 and vice versa. These functions further include, when receiving a data request from the web server 208, forwarding transformed data of a data request to the connector object 220 associated with the particular mapper object 212. The functions of each mapper object 212 further include, when receiving data from a connector object 220, forwarding transformed data received from the respective associated connector object 220 to the web server 208 for communication back to the requesting app 202.

Connector objects 220 execute to process data requests forwarded by object mappers and data in response to data requests forwarded to the enterprise layer 230 via the interfaces 232, 234, 236. Each connector object 220 is executable to transform data between the format of the respective connector object 220 into at least one data interchange protocol of an interface of the enterprise layer 230. Each connector objects 220 is further executable to forward transformed data of a data request received from a mapper object 212 to an interface 232, 234, 236 of the enterprise layer 230. The connector objects 220 are also executable to forward transformed data received from an interface 232, 234, 236 of the enterprise layer 230 to an appropriate mapper object 212 from which the data request at the connector object 220 was received.

Due to the flexible nature of how mapper objects 212 and connector objects 220 can be associated, the web framework 210 of the system 200 allows for easy addition of new mapper objects 212 and connector objects 220 to meet evolving needs of an organization. For example, if a new app 202 is to be deployed that will access at least some functionality of the enterprise layer 230, one or more new mapper objects 212 may be defined and associated with appropriate connector objects 220 for the new app. Further, in the event of a change to one of the interfaces 232, 234, 236 of the enterprise layer 230, it is unlikely the mapper objects 212 will need to be changed. Instead, the needed modifications would be made to the connector objects 220. Similarly, if a change is made to the app 202 that impacts data communicated from or to the app 202, only the mapper objects 212 of a mapper object 212 group 214, 216, 218 would need to be modified. Thus, changes can be effected rapidly and without significant impact on the enterprise layer 230 or various apps 202 supported by the system 200.

In an example embodiment, the app may submit a request for data via the network 204 to the web server 208. In some embodiments, the web server 208 may identify that the request is received from a particular app and encoded according to an application protocol such as HTTP. In such embodiments, based on the particular app and the particular data format, the web server 208 may forward the request to a particular group 214 of mapper objects 212 within the web framework 210. In other embodiments, the web server 208 may determine, based on a URI of the request or data included therein, that the request is with regard to an object in the web framework 210. The web server 208 may then simply forward the request from the app to the web framework 210 to route to the appropriate mapper object 212.

Assuming the request is an HTTP request, the request may be forwarded to the user interface mapper object 252 of the mapper object 212 group 214. The user interface mapper object 252 will then transform the request into a format of the associated user interface connector object 226 and forward the request thereto. Upon receipt of the request, the user interface connector object 226 may perform another transformation of the request into a format of the user interface interface 234 of the enterprise layer 230 and communicate the request thereto.

The request when received by the user interface interface 234 of the enterprise layer 230 may then cause the request to be processed by the business logic 238 of the enterprise layer 230. In some embodiments, when the request includes a data creation, update, or deletion request, regardless of what type of data edits may have been applied to the data of the request prior to submission by the app 202, the business logic or other portions of the enterprise layer 230 will perform edits on the data to ensure compliance with any data constraints, requirements, or other rules. The enterprise layer, upon processing the request, will typically respond with the request data, which may be or include a confirmation of a data processing activities performed, requested data, which may include user interface definitions, and other data or content depending on the particular request. The response may be communicated by the enterprise layer 230 via the user interface interface 234 to the user interface connector object 226.

The user interface connector object 226, upon receipt of the response to the request from the enterprise layer 230, may then transform the received response from the format of the user interface interface 234 to a format of the user interface mapper object 252 and send the transformed response thereto. The user interface mapper object 252 may then transform the response into a format of the app 202 and transmit the transformed response either directly to the app 202 or via the web server 208, depending on the particular embodiment.

In some embodiments, by providing the system architecture that includes both mapper objects 212 and connector objects 220 between a deployed app 202 and an enterprise layer 230, the deployed app 202 is able to access functionality provided by the enterprise layer 230. The functionality of the enterprise layer 230 may include one or more of point of sale, reporting, data entry, data searching, customer relationship management, accounting, finance, and other functionality. The app 202 may be an omnibus in nature whereby the app provides a vast amount of functionality of the enterprise layer 230. However, in other embodiments, the app 202 may provide a relatively narrow amount of functionality, such as a point of sale app that allows a user to scan bar codes of products via an optical sensor (i.e., camera) of a device and enter credit card numbers for sales of goods or a customer relationship management app that only allows a user view contact information of customers and record information regarding a interactions with customers. Regardless of the functional scope of a particular app 202 in various embodiments, the app 202 is enabled to access functionality of the enterprise layer due to the mapper objects 212 and the connector objects 220.

In some embodiments, the app 202 may access some functionality of the enterprise layer 230, but the app 202 may also provide additional functionality that is not directly associated with or related to the enterprise layer 230. For example, an example app may be a reader-type app that provides access to content from one or more news sources such as blogs, social media sites, news outlets, and the like. The app may also include customer relationship management functionality of the enterprise layer 230 and provide a mechanism whereby a user can selected a one or more of a story, posting, video, or other content item to be forwarded to a customer contact identified and retrieved via the enterprise layer 230. This is one example of how an app 202 that has generally has a non-business related purpose can be augmented with functionality of or supported by the enterprise layer. 230 via the system 200 and the transformation services provided by the mapper objects 212 and connector objects 220 included therein.

Figure 3:
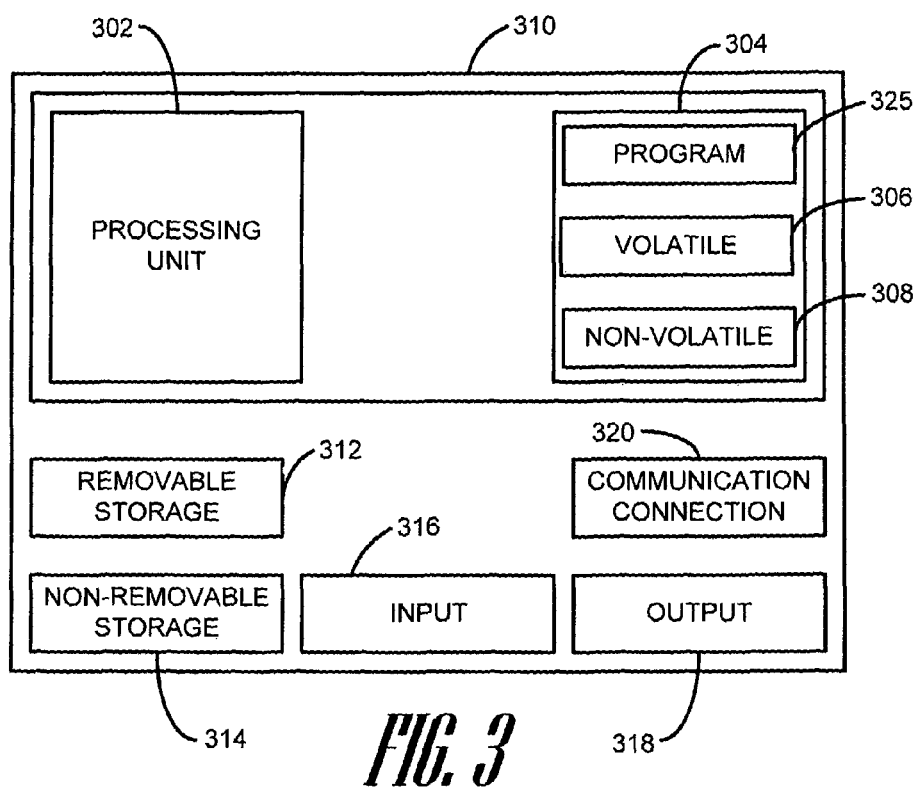
FIG. 3 is a block diagram of a computing device, according to an example embodiment.

FIG. 3 is a block diagram of a computing device, according to an example embodiment. The computing device is an example of a computing device upon which one or more of the embodiments described herein can be performed. Some embodiments may include multiple of such computing devices, such as at least one computing device for each of an app, a web platform, and an enterprise layer.

In one embodiment, multiple such computer systems are utilized in a distributed network to implement multiple components in a transaction-based environment. An object-oriented, service-oriented, or other architecture may be used to implement such functions and communicate between the multiple systems and components. The computing device may be in the form of a personal computer, a server-class computer, a smartphone, a controller of a device such as a set top box, a tablet computer, or other computing device. One example computing device in the form of a computer 310, may include a processing unit 302, memory 304, and non-removable storage 314. The computing device in some embodiments may also include removable storage 312. Memory 304 may include volatile memory 306 and non-volatile memory 308. Computer 310 may include—or have access to a computing environment that includes—a variety of computer-readable media, such as volatile memory 306 and non-volatile memory 308, removable storage 312 and non-removable storage 314. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 310 may include or have access to a computing environment that includes input 316, output 318, and a communication connection 320. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 302 of the computer 310. A hard drive, CD-ROM, other optical mediums, flash memory device, and RAM are some examples of articles including a computer-readable medium. For example, a computer program 325 including executable instructions for performing one or more of the methods and other embodiments illustrated and described herein may be included on a CD-ROM and loaded from the CD-ROM to a hard drive.

Figure 4:
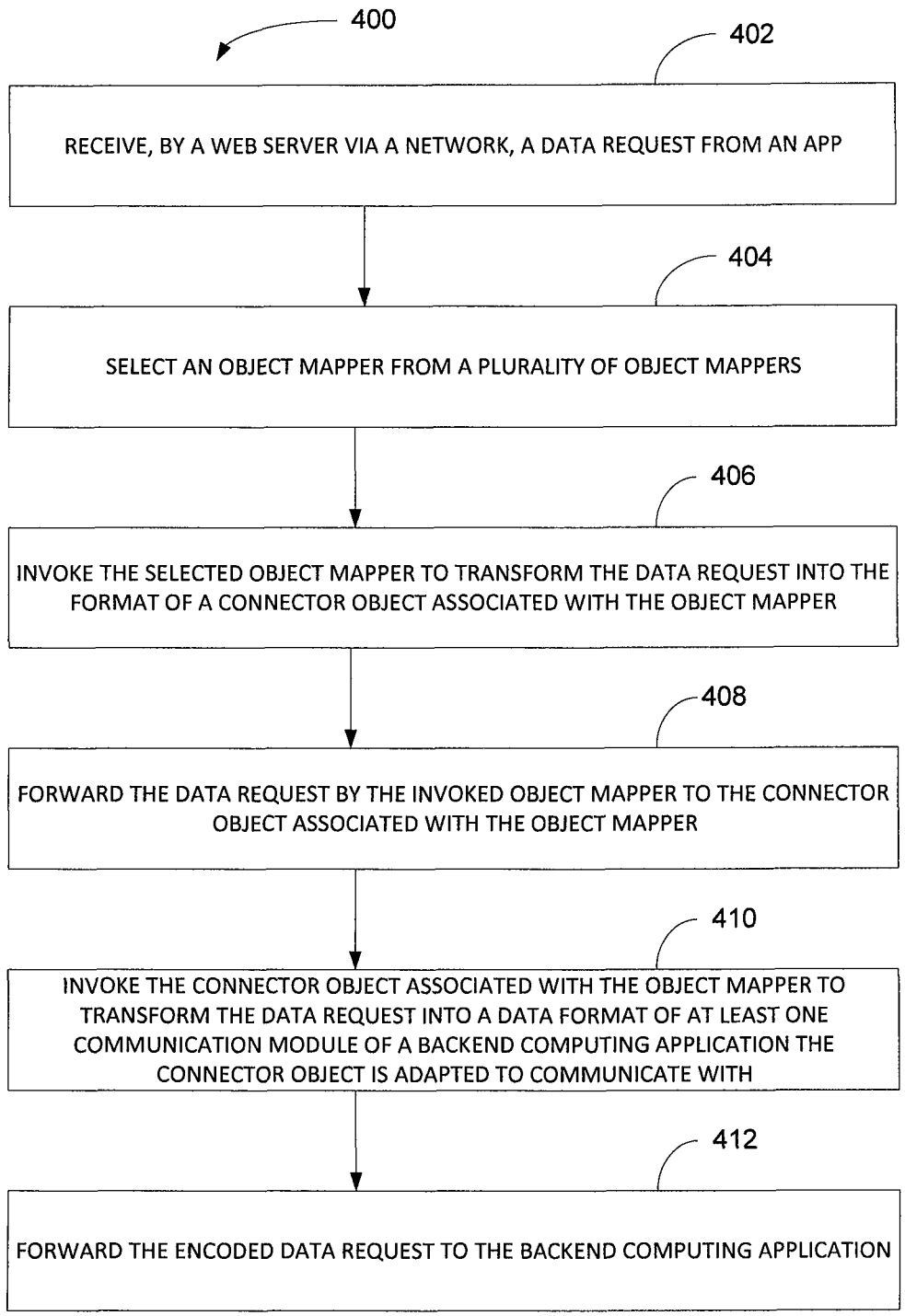
FIG. 4 is a flow diagram of a method, according to an example embodiment.

FIG. 4 is a flow diagram of a method 400, according to an example embodiment. The method 400 is an example of method for processing a request received from an app on a web platform, such as app 202 and web platform layer 206 of FIG. 2.

The method 400 includes receiving 402, by a web server via a network, a data request from an app. The data request is encoded according to an application protocol, such as HTTP. The method 400 further includes selecting 404 an object mapper, from a plurality of object mappers, to process the data request based on at least one of the app from which the data request was received and the data interchange protocol. The method 400 also includes invoking 406 the selected object mapper to transform the data request into the format of a connector object associated with the object mapper. Next, the method 400 forwards 408 the data request by the invoked object mapper to the connector object associated with the object mapper which then invokes 410 the connector object to transform the data request into a data format of at least one communication module of a backend computing application, such as an enterprise-class computing system. The connector object then forwards 412 the encoded data request to the backend computing application.

In some embodiments of the method 400, the data request received by the web server is a request for user interface definition data from which the requesting app can render at least a portion of a user interface. The requesting app in such embodiments may have a RESTful architecture that supports an application layer protocol for consuming Representational State Transfer (REST) data as may be provided by an object mapper to the app. Thus, the object mapper in such embodiments may be enabled to transform data received from a backend computing application, such as an enterprise-class computing system, via a connector object.

In some embodiments of the method 400, a number of connector objects executable within the web framework is at least equal to a number of a plurality of communication modules of the backend computing application. Further, each connector object may be dedicated to a defined or a combination of defined data interchange protocols of a communication module of the backend computing application.

Figure 5:
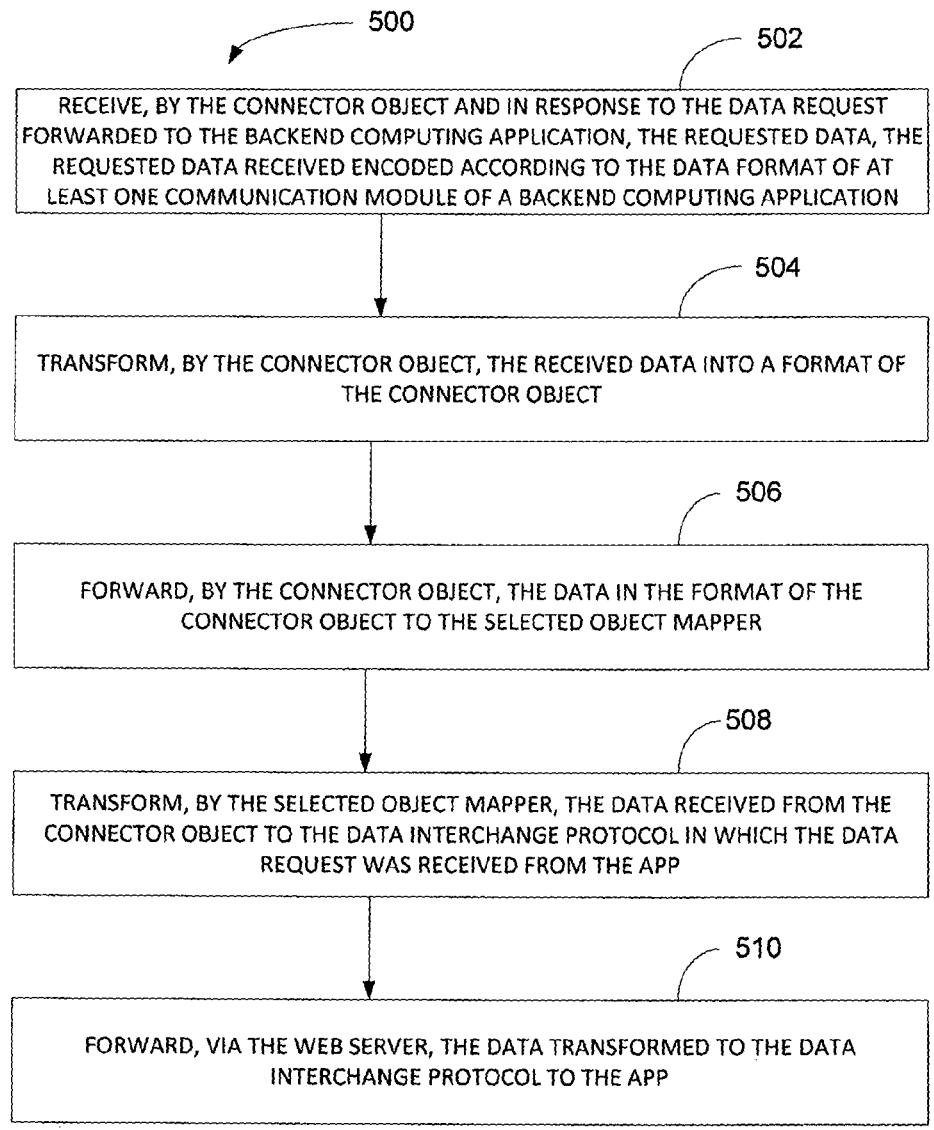
FIG. 5 is a flow diagram of a method, according to an example embodiment.

FIG. 5 is a flow diagram of a method 500, according to an example embodiment. The method 500 is an example of a method that is performed in conjunction with the method 400 of FIG. 4, but operates in a reverse direction to return data from the backend computing application, such as an enterprise-class computing system, to the app.

The method 500 includes receiving 502, by the connector object and in response to the data request forwarded to the backend computing application, the requested data. The requested data is typically received encoded according to the data format of at least one communication module of a backend computing application. The method 500 further includes transforming 504, by the connector object, the received data into a format of the connector object and forwarding 506 the transformed data in the format of the connector object to the object mapper from which the request was originally received. The method 500 also includes transforming 508, by the object mapper, the data received from the connector object to the data interchange protocol in which the data request was received from the app. The object mapper then forwards 510, via the web server, the data transformed to the data interchange protocol to the app.

Another embodiment is in the form of a system. The system in such embodiments includes at least one computing device including at least one processor, at least one memory device, and at least one network interface device. The system in such embodiments also includes a web server application stored in the at least one memory device and executable by the at least one processor to receive, process, and respond to data requests received via the at least one network interface device from an app. The system may further include a web application server stored in the at least one memory device and executable by the at least one processor to provide an execution environment for modules that execute to service data requests received via the web server.

In some embodiments, the modules may include a plurality of object mapper modules that execute to process the data request based on at least one of an app from which the data request was received and a data interchange protocol the request is encoded in. The system also typically includes a plurality of connector object modules that execute to process data requests forwarded by an object mapper module and data in response to data requests forwarded to a backend computing application.

The plurality of object mapper modules, in some embodiments, are each executable for various purposes. Some such purpose include transforming data between the data interchange protocol of the app and a format of a connector object module associated with the particular object mapper module. The purpose also include forwarding transformed data of a data request to the connector object module associated with the particular object mapper module and forwarding transformed data received from the respective associated connector object module to the web server.

The plurality of connector object modules, in some embodiments, are each executable for various purposes. Some such purpose include transforming data between the format of the respective connector object module into at least one data interchange protocol of a backend computing application. The purposes may also include forwarding transformed data of a data request to the backend computing application and forwarding transformed data received from the backend computing application to the respective mapper object module from which the data request was received.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
   receiving, by a web server via a network, a data request from an app, the data request encoded according to a data interchange protocol;
   selecting an object mapper group, from a plurality of object mapper groups, to process the data request based on the app from which the data request was received, each of the object mapper groups including a plurality of object mappers present and executable in a web application server, the object mappers of each respective object mapper group implemented to support one app;
   selecting an object mapper from the plurality of object mappers within the selected object mapper group, the object mapper selected based on the data interchange protocol;
   invoking the selected object mapper to transform the data request into the format of a connector object associated with the selected object mapper, the invoked object mapper executable within a web framework of the web application server;
forwarding the data request by the invoked object mapper to the connector object associated with the object mapper;
invoking the connector object associated with the object mapper to transform the data request into an encoded data format of at least one communication module of a backend computing application the connector object is adapted to communicate with, the invoked connector object present and executable in the web application server;
forwarding, by the connector object, the encoded data request to the backend computing application;
receiving, by the connector object and in response to the data request forwarded to the backend computing application by the connector object, the requested data, the requested data received encoded according to the data format of at least one communication module of the backend computing application;
transforming, by the connector object, the received data into a format of the connector object;
forwarding, by the connector object, the data in the format of the connector object to the selected object mapper of the selected object mapper group;
transforming, by the selected object mapper, the data received from the connector object to the data interchange protocol in which the data request was received from the app; and
forwarding, via the web server, the data transformed to the data interchange protocol to the app.

2. The method of claim 1, wherein the data request received by the web server is a request for user interface definition data from which the requesting app can render at least a portion of a user interface.

3. The method of claim 1, wherein the data request received by the web server is a request for application data, the request encoded in a standards-based, lightweight data interchange format protocol.

4. The method of claim 1, wherein a number of connector objects executable within the web framework is at least equal to a number of a plurality of communication modules of the backend computing application.

5. The method of claim 4, wherein each connector object is dedicated to a defined or a combination of defined data interchange protocols of a communication module of the backend computing application.

6. The method of claim 4, wherein the selected object mapper is one of a plurality of object mappers and the web application server includes, for each supported app, an object mapper associated with each respective connector object.

7. A non-transitory computer-readable medium, with instructions stored thereon, which when executed by at least one processor of at least one computing device cause the at least one computing device to perform actions comprising:
receiving, by a web server via a network, a data request from an app, the data request encoded according to a data interchange protocol;
selecting an object mapper group, from a plurality of object mapper groups, to process the data request based on the app from which the data request was received, each of the object mapper groups including a plurality of object mappers present and executable in a web application server, the object mappers of each respective object mapper group implemented to support one app;
selecting an object mapper from the plurality of object mappers within the selected object mapper group, the object mapper selected based on the data interchange protocol;
invoking the selected object mapper to transform the data request into the format of a connector object associated with the selected object mapper, the invoked object mapper executable within a web framework of the web application server;
forwarding the data request by the invoked object mapper to the connector object associated with the object mapper;
invoking the connector object associated with the object mapper to transform the data request into an encoded data format of at least one communication module of a backend computing application the connector object is adapted to communicate with, the invoked connector object present and executable in the web application server;
forwarding, by the connector object, the encoded data request to the backend computing application;
receiving, by the connector object and in response to the data request forwarded to the backend computing application by the connector object, the requested data, the requested data received encoded according to the data format of at least one communication module of the backend computing application;
transforming, by the connector object, the received data into a format of the connector object;
forwarding, by the connector object, the data in the format of the connector object to the selected object mapper of the selected object mapper group;
transforming, by the selected object mapper, the data received from the connector object to the data interchange protocol in which the data request was received from the app; and
forwarding, via the web server, the data transformed to the data interchange protocol to the app.

8. The non-transitory computer-readable medium of claim 7, wherein the data request received by the web server is a request for user interface definition data from which the requesting app can render at least a portion of a user interface.

9. The non-transitory computer-readable medium of claim 7, wherein the data request received by the web server is a request for application data, the request encoded in a standards-based, lightweight data interchange format protocol.

10. The non-transitory computer-readable medium of claim 7, wherein a number of connector objects executable within the web framework is at least equal to a number of a plurality of communication modules of the backend computing application.

11. The non-transitory computer-readable medium of claim 10, wherein each connector object is dedicated to a defined or a combination of defined data interchange protocols of a communication module of the backend computing application.

12. The non-transitory computer-readable medium of claim 10, wherein the selected object mapper is one of a plurality of object mappers and the web application server includes, for each supported app, an object mapper associated with each respective connector object.

13. A system comprising:
at least one computing device including at least one processor, at least one memory device, and at least one network interface device;
a web server application stored in the at least one memory device and executable by the at least one processor to receive, process, and respond to data requests received via the at least one network interface device from an app;

a web application server stored in the at least one memory device and executable by the at least one processor to provide an execution environment for modules that execute to service data requests received via the web server, the modules including:

a plurality of object mapper modules, organized into a plurality of object mapper groups each including a plurality of object mapper modules, that execute to process the data requests based on an app from which a respective data request was received and a data interchange protocol the respective request is encoded in, the web application server including an executable process to select an object mapper group based on an app from which the respective data request was received and to select an object mapper module of the selected object mapper group based on the data interchange protocol of the respective data request, each object mapper module executable:

to transform data between the data interchange protocol of the app and a format of a connector object module associated with the particular object mapper module;

to forward transformed data of a data request to the connector object module associated with the particular object mapper module;

to forward transformed data received from the respective associated connector object module to the web server;

to transform data received from a connector object module to the data interchange protocol in which the data request was received from the app; and forward, via the web server application, the data transformed to the data interchange protocol to the app;

a plurality of connector object modules that execute to process data requests forwarded by an object mapper module and data in response to data requests forwarded to a backend computing application, each connector object module executable to:

transform data between the format of the respective connector object module into at least one data interchange protocol of a backend computing application;

to forward transformed data of a data request to the backend computing application;

to forward transformed data received from the backend computing application to the respective mapper object module from which the data request was received;

to receive, in response to the transformed data request forwarded to the backend computing application, the requested data, the requested data received encoded according to the data format of at least one communication module of the backend computing application;

to transform the received data into a format of the respective connector object module; and to forward the data in the format of the respective connector object module to the particular object mapper module of the selected object mapper group.

14. The system of claim 13, wherein a number of connector object modules stored and executable within the execution environment of the web application server is at least equal to a number of a plurality of communication modules of the backend computing application where each communication module of the backend computing application is dedicated to a defined data type.

15. The system of claim 14, wherein the plurality of object mapper modules includes a set of object mapper modules for each app supported by the system, a number of object mapper modules included in each set of object mapper modules equal to the number of connector object modules.

16. The system of claim 14, wherein the defined data types for which a respective connector object module is stored and executable within the execution environment of the web application server include a data type for remote function calls, a data type for Representation State Transfer (RESTful) data, and at least one web services data type.

17. The system of claim 13, wherein the connector object modules connect backend computing application functionality to the web application server and the object mapper modules map the backend computing application functionality from the web application server to the app.

18. The system of claim 13, wherein the app is a native, lightweight application of a smartphone device.

* * * * *